(12) United States Patent
Martinelli et al.

(10) Patent No.: US 8,333,342 B2
(45) Date of Patent: Dec. 18, 2012

(54) FLAPPING-WING FLYING VEHICLE

(75) Inventors: Pascal Martinelli, Arcueil (FR);
Thomas Ravasi, Aubervilliers (FR);
Christophe Grand, Villejuif (FR);
Stephane Doncieux, Villejuif (FR);
Jean-Baptiste Mouret, Paris (FR);
Emmanuel De Margerie, Rennes (FR)

(73) Assignees: Universite Paris Sud, Orsay Cedex (FR); Centre National de la Recherche Scientifique, Paris (FR); Universite Pierre et Marie Curie (Paris 6), Paris (FR)

( * ) Notice: Subject to any disclaimer, the term of this patent is extended or adjusted under 35 U.S.C. 154(b) by 432 days.

(21) Appl. No.: 12/679,289

(22) PCT Filed: Sep. 16, 2008

(86) PCT No.: PCT/FR2008/001294
§ 371 (c)(1),
(2), (4) Date: May 20, 2010

(87) PCT Pub. No.: WO2009/068762
PCT Pub. Date: Jun. 4, 2009

(65) Prior Publication Data
US 2010/0308159 A1    Dec. 9, 2010

(30) Foreign Application Priority Data
Sep. 20, 2007  (FR) ..................... 07 06616

(51) Int. Cl.
*B64C 33/00* (2006.01)
(52) U.S. Cl. .......................................... 244/22; 244/11

(58) Field of Classification Search ................... 244/22,
244/11, 28, 72; 416/83; 446/35
See application file for complete search history.

(56) References Cited

U.S. PATENT DOCUMENTS

| 1,635,892 A * | 7/1927 | Kinzie ............................ 244/22 |
| 7,651,051 B2 * | 1/2010 | Agrawal et al. .................. 244/22 |
| 2004/0195436 A1 * | 10/2004 | Sinclair ........................... 244/49 |
| 2007/0210207 A1 * | 9/2007 | Liao ................................ 244/22 |

FOREIGN PATENT DOCUMENTS

| DE | 364986 A | | 1/1932 |
| FR | 419 140 A | | 8/1910 |
| GB | 2209727 A | * | 5/1989 |
| WO | 2008/010830 A2 | | 1/2008 |

* cited by examiner

*Primary Examiner* — Christopher P Ellis
(74) *Attorney, Agent, or Firm* — Sughrue Mion PLLC

(57) ABSTRACT

The invention relates to a flapping-wing flying vehicle, the vehicle including a frame having two pivots mounted thereon to pivot about two parallel hinge axes (X), each pivot carrying a respective wing, the vehicle including a first oscillation generator for causing the pivots to oscillate in order to cause the wings to flap, said first oscillation generator comprising: two arms (6), each secured to a respective pivot (2); two cranks (9), each hinged to the end of a respective one of the arms about respective axes (X1) parallel to the hinge axes (X) of the pivots; a connecting rod (10) hinged to the ends of the two cranks about axes (X2) parallel to the hinge axes (X) of the pivots; synchronization means (4) for synchronizing the rotation of the two pivots such that the rotations of the pivots are equal and opposite; two electric motors (7), each placed to cause one of the cranks to rotate relative to the associated arm; and control means (50) for controlling and synchronizing the speeds of rotation of the motors and for controlling the phase difference between the motors.

6 Claims, 3 Drawing Sheets

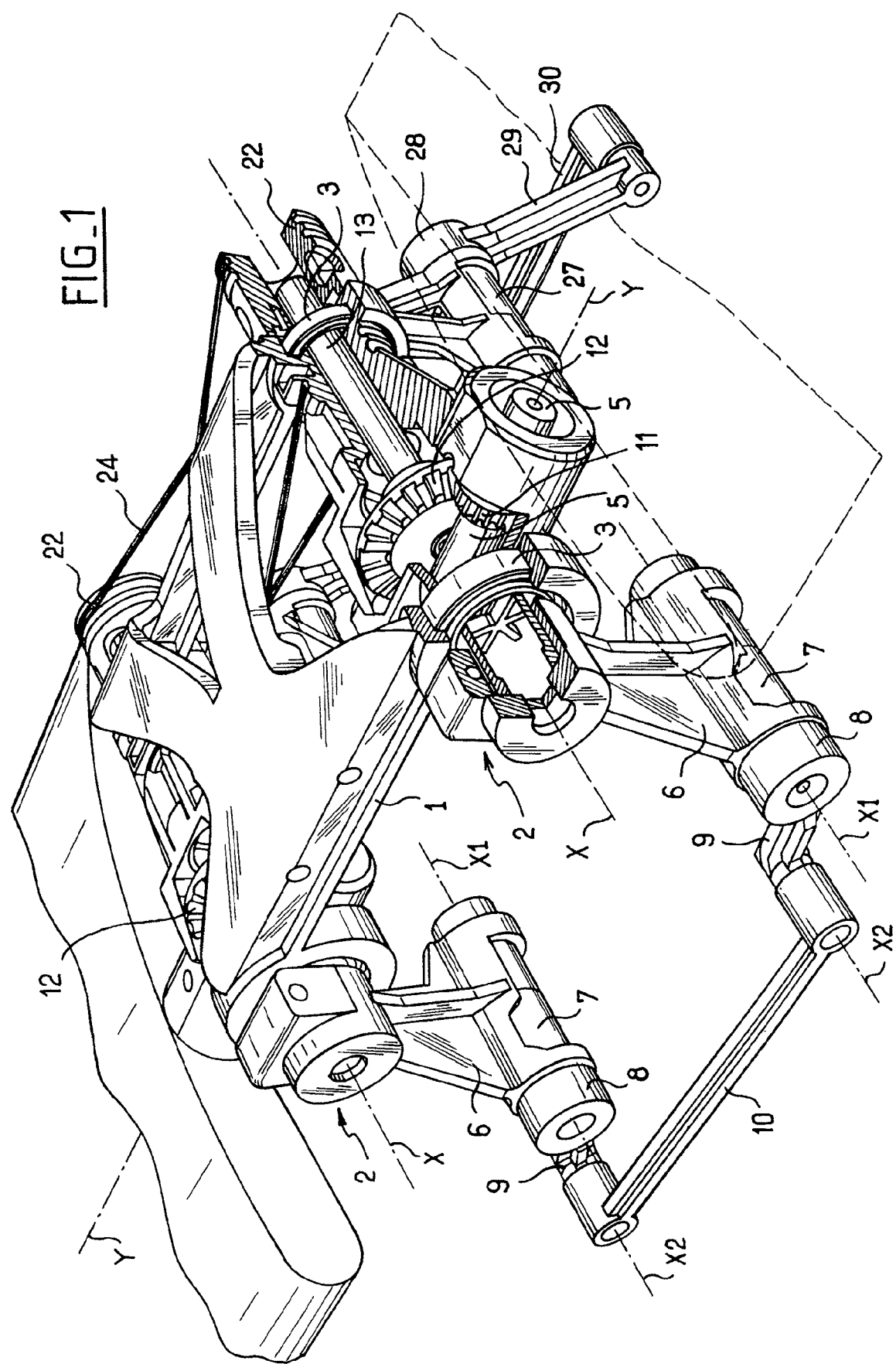
FIG_1

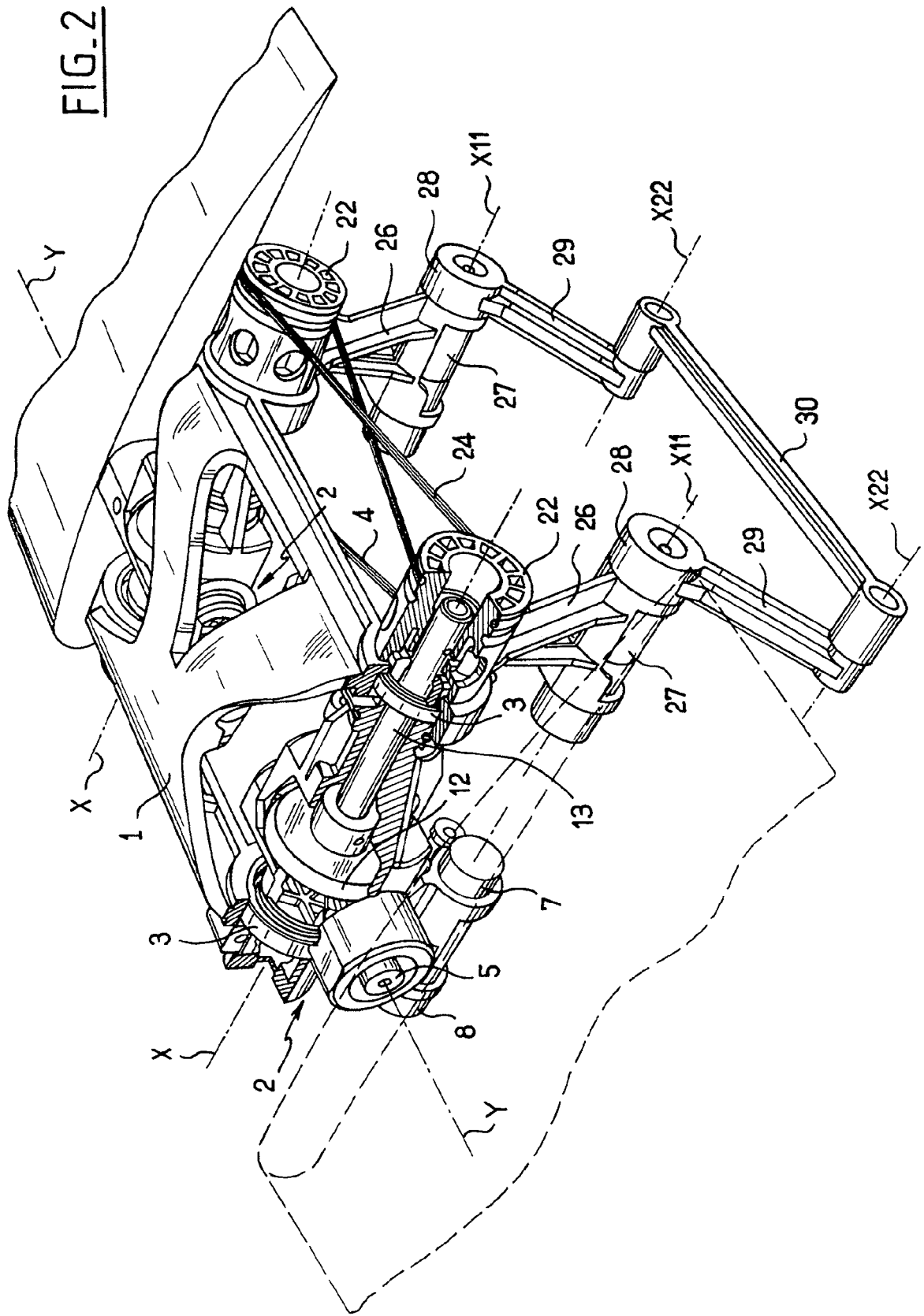

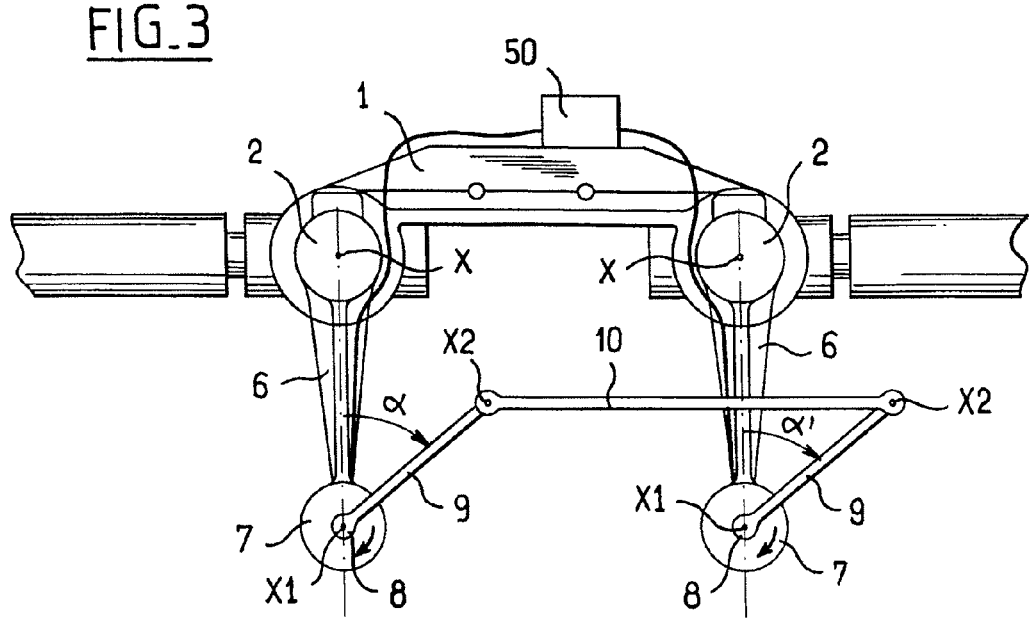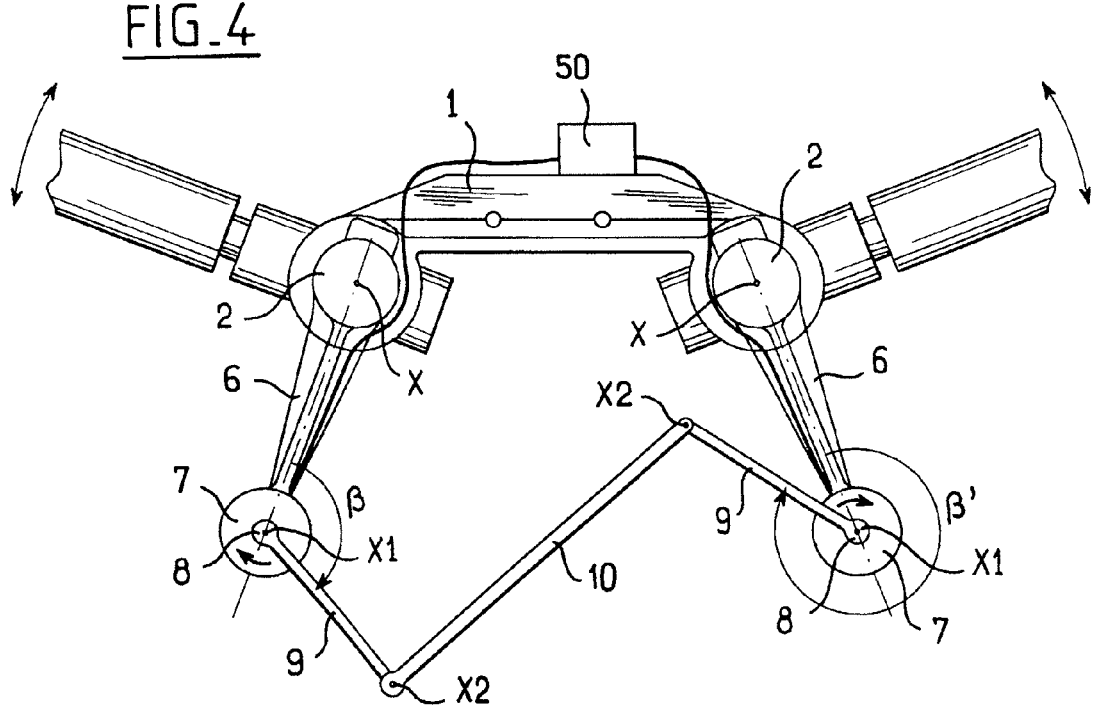

FLAPPING-WING FLYING VEHICLE

The invention relates to a flapping-wing flying vehicle of the ornithopter type.

BACKGROUND OF THE INVENTION

Flying vehicles are known that are fitted with two flapping wings. Various mechanisms have been proposed for actuating the wings. Many of them make use of a crank and connecting rod system actuated by an electric motor. In order to vary the frequency of flapping, it suffices to act on the speed of rotation of the electric motor. Nevertheless, without providing an additional actuator, those systems do not enable the amplitude of the flapping to be varied.

OBJECT OF THE INVENTION

An object of the invention is to provide a very simple device for wing flapping, enabling both the frequency and the amplitude of the flapping of the wings to be regulated.

BRIEF DESCRIPTION OF THE INVENTION

According to the invention, there is provided a flapping-wing flying vehicle, the vehicle including a frame having two pivots mounted thereon to pivot about two parallel hinge axes, each pivot carrying a respective wing. According to the invention, the vehicle includes a first oscillation generator for causing the pivots to oscillate in order to cause the wings to flap, said first oscillation generator comprising:

- two arms, each secured to a respective pivot;
- two cranks, each hinged to the end of a respective one of the arms about respective axes parallel to the hinge axes of the pivots;
- a connecting rod hinged to the ends of the two cranks about axes parallel to the hinge axes of the pivots;
- synchronization means for synchronizing the rotation of the two pivots such that the rotations of the pivots are equal and opposite;
- two electric motors, each placed to cause one of the cranks to rotate relative to the associated arm; and
- control means for controlling and synchronizing the speeds of rotation of the motors and for controlling the phase difference between the motors.

By causing the two motors to rotate continuously at the same speed, the two wings are caused to flap in reciprocating manner. By acting on the phase difference between the two motors, the amplitude of the flapping movement is adjusted. It is optionally possible to obtain no flapping by ensuring that the motors are in phase, i.e. by causing the cranks to remain parallel to each other.

Thus, using two parameters that are simple to control (common speed and phase difference of the motors), it is possible to control both the frequency and the amplitude with which the wings flap.

It should be observed that the speed of rotation of the motors need not be constant. Nevertheless, it is important for the motors to remain synchronized with each other, unless an additional degree of freedom is introduced into the system.

BRIEF DESCRIPTION OF THE DRAWINGS

The invention can be better understood in the light of the following description with reference to the accompanying drawings, in which:

FIG. 1 is a partially cutaway three-quarter perspective view seen from in front of a device constituting a particular embodiment of the invention, with one of its wings drawn using dashed lines;

FIG. 2 is a partially cutaway three-quarter perspective view seen from behind of the device shown in FIG. 1, one of the wings being drawn in dashed lines;

FIG. 3 is a front view of the device of FIG. 1 showing operation in which its motors are in phase; and FIG. 4 is a front view of the FIG. 1 device showing operation in which its motors are out of phase.

DETAILED DESCRIPTION OF THE INVENTION

With reference to the figures, and in accordance with a particular embodiment of the invention, the device comprises a frame 1 carrying two pivots 2 rotatably mounted on the frame about parallel axes X. In the cutaway portion of the frame 1, there can be seen the ball bearings 3 that support one of the pivots 2.

Each pivot 2 carries a pivoting support 5 that is mounted to rotate in the pivot about an axis Y perpendicular to the axis X (only the pivoting support of the left pivot is visible in FIG. 1). The wing is attached directly to the pivoting support 5 so that its span extends substantially along the axis Y. Thus, reciprocating oscillation of one of the pivots 2 about the axis X causes the associated wing to flap, while oscillation of the pivoting support 5 about the axis Y varies the angle of incidence of the associated wing.

There follows a detailed description of a first oscillation generator controlling the flapping of the wings. The oscillation generator comprises firstly a crossed belt 4 engaged in grooves of the pivot 2 enabling the pivots to be angularly synchronized so that when one of the pivots 2 turns through a given angle, the other pivot turns through an angle that is equal and opposite. In a variant, it would be possible to use a connection by means of gears, or any other passive mechanical system that enables the respective rotations of the two pivots 2 to be synchronized.

The first oscillation generator has arms 6, each secured to a respective one of the pivots 2 and extending to receive at their opposite ends respective electric motors 7, each having an outlet shaft with a rotary end 8 rotating about an axis X1 parallel to the axis X. In this embodiment, the arms 6 extend downwards and they are substantially vertical when the axes Y extend horizontally, as can be seen more particularly in FIG. 3. Each rotary end 8 carries a crank 9. The ends of the cranks 9 are hinged to a connecting rod 10 about axes X2 that are likewise parallel to the axes X.

In this embodiment, the arms 6 are of a length (measured between the axes X and X1) greater than the length of the cranks 9 (measured between the axes X1 and X2), while the connecting rod 10 is of a length (measured between the two axes X2) that is equivalent to the distance between the axes X.

The wings are caused to flap as follows. In FIG. 3, the electric motors 7 are rotating in the same direction and at the same speed. The cranks 9 are parallel to each other such that the angles α and α' remain equal at all instants. The electric motors 7 are said to be in phase. This movement does not produce any oscillation of the arms 6, and as a result it does not produce any oscillation of the pivots 2. The wings do not flap.

In FIG. 4, the electric motors 7 are turning at the same speed, but they are out of phase. One of the cranks 9 is angularly offset relative to the other crank. The angles β and β' are not equal. Continuous rotation of the electric motors 7 in the same direction and at the same speed induces flapping oscillation of the arms 6, and thus also of the pivots 2. The wings flap by oscillating about the axes X.

In this embodiment, each electric motor 7 includes an angular position sensor and is connected to a control unit 50 that powers the motors and that receives information from the sensors. In order to vary the frequency of the flapping, the control unit 50 causes the speed of rotation of the electric motors 7 to vary, while ensuring that the motors are synchronized and achieve the same speed of rotation. In order to vary the amplitude of the flapping, the control unit 50 varies the phase difference between the two electric motors 7, e.g. by temporarily slowing down one of the motors until the desired phase difference is obtained, and then reaccelerating said motor to cause it to turn at the same speed as the other motor.

There follows a description in detail of a second oscillation generator enabling the angles of incidence of the wings to be controlled. This oscillation generator is based on a principle similar to that of the first oscillation generator. It is recalled that each wing is secured, not directly to the corresponding pivot 2, but rather to the pivoting support 5 that is rotatably mounted in the pivot about the axis Y.

Returning to FIGS. 1 and 2, it can be seen that each pivoting support 5 includes a bevel gear 11 that co-operates with a bevel gear 12 mounted at the end of a drive shaft 13 that is rotatably mounted in the pivot 2 about the axis X. The two bevel gears form an angle take-off connecting rotation of the pivoting support 5 about the axis Y with rotation of the corresponding drive shaft 13 about the axis X. The other end of each drive shaft 13 is secured to a sleeve 22. The sleeves 22 are synchronized in rotation by means of a crossed belt 24, such that rotation of one of the drive shafts 13 in one direction causes rotation of the other drive shaft 13 through the same angle and in the opposite direction.

Each sleeve 22 includes an arm 26 that extends to receive at its other end an electric motor 27 having a rotary end 28 rotating about an axis X11 parallel to the axis X. In this embodiment, the arms 26 extend downwards and they are substantially vertical when the axes Y extend horizontally. Each rotary end 28 carries a crank 29. The ends of the cranks 29 are hinged to a connecting rod 30 about axes X22, likewise parallel to the axes X.

In this embodiment, the arms 26 are of a length (measured between the axes X and X11) that is longer than the length of the cranks 29 (measured between the axes X11 and X22), whereas the connecting rod 30 is of a length (measured between the two axes X22) that is equivalent to the distance between the axes X.

This second oscillation generator operates exactly like the first. When the electric motors 27 are in phase, the cranks 29 remain parallel to each other such that the drive shafts 13 do not turn. They remain stationary in rotation. No oscillation of the angle of incidence is delivered by the second oscillation generator. Nevertheless, it should be observed that if the first oscillation generator is activated to cause the wings to perform flapping oscillation, the flapping oscillation induces oscillation in the angles of incidence of the wings. Because of the connections via the bevel gears 11, 12 between the pivoting support 5 and the drive shaft 13, rotation of the pivot 2 about the axis X has the effect of inducing rotation of the pivoting support 5, even though the drive shaft 13 remains stationary. The wings are thus subjected to an induced oscillation in their angles of incidence, at a frequency that is identical to the frequency of the flapping oscillation.

In contrast, when the electric motors 27 are out of phase, the rotation of the cranks 29 induces controlled oscillation of the arms 26 and consequently of the sleeves 24 and thus of the drive shaft 13. This oscillation is communicated via the bevel gears 11, 12 to the pivoting supports 5, which oscillate in turn, thereby causing the angles of incidence of the wings to oscillate in controlled manner in addition to the oscillation of the angles of incidence that is induced by the fact that the pivots 2 are oscillating about the axes X.

The control unit 50 is also suitable for controlling the motors 27 of the second oscillation generator in the same manner as for the electric motors 7. It is advantageous to adapt the speed of rotation of the motors 27 to ensure that the frequency with which the angles of incidence of the wings oscillates coincides with the frequency with which the flapping of the wings oscillates.

The invention is not limited to the above description, but on the contrary covers any variant coming within the ambit defined by the claims.

In particular, although a device is shown that includes a first oscillation generator for controlling the flapping of the wings and a second oscillation generator for controlling their angles of incidence, it is possible, while remaining within the ambit of the invention, to provide a device that is fitted solely with one oscillation generator that controls the flapping of the wings. Oscillation of the angles of incidence coupled to the flapping oscillation is then obtained very simply by preventing the drive shafts 13 from rotating. The device is then simplified, even though it is no longer possible to adjust the oscillation of the angles of incidence in amplitude and in frequency.

If no oscillation of the angles of incidence is desired, it is possible to simplify the device by eliminating the drive shafts 13 and the pivoting supports and by securing the wings directly to the pivots 2.

Although the motors are located at the ends of the arms in each of the actuator members, it is also possible to place the motors on the frame and to constrain the cranks to rotate together with the motors by means of a transmission by belt or by any other known transmission means. This reduces the moment of inertia about the axes X of the pivots or of the sleeves.

What is claimed is:

1. A flapping-wing flying vehicle, the vehicle including a frame having two pivots mounted thereon to pivot about two parallel hinge axes (X), each pivot carrying a respective wing, the vehicle including a first oscillation generator for causing the pivots to oscillate in order to cause the wings to flap, wherein said first oscillation generator comprises:
    two arms (6), each secured to a respective pivot (2);
    two cranks (9), each hinged to the end of a respective one of the arms about respective axes (X1) parallel to the hinge axes (X) of the pivots;
    a connecting rod (10) hinged to the ends of the two cranks about axes (X2) parallel to the hinge axes (X) of the pivots;
    synchronization means (4) for synchronizing the rotation of the two pivots such that the rotations of the pivots are equal and opposite;
    two electric motors (7), each placed to cause one of the cranks to rotate relative to the associated arm; and
    control means (50) for controlling and synchronizing the speeds of rotation of the motors and for controlling the phase difference between the motors.

2. A flying vehicle according to claim 1, wherein the synchronization means comprise a crossed belt (4) tensioned between the pivots (2).

3. A flying vehicle according to claim 1, wherein the motors are carried at the ends of the arms (6), each crank (9) being secured a rotary end (8) of the corresponding motor.

4. A flying vehicle according to claim 1, wherein the pivots (2) receive pivoting supports (5) that are mounted on the pivots to turn about axes (Y) perpendicular to the hinge axes (X), the wings being connected directly to the pivoting supports, the flying vehicle including a second oscillation generator (11, 12, 13) for causing the pivoting supports to oscillate in order to cause the angles of incidence of the wings to oscillate, said second oscillation generator comprising:

two drive shafts (13) mounted to turn about the hinge axes of the pivots and connected to rotate with the pivoting supports via respective angle take-offs (11, 12);

two arms (26), each secured to a respective one of the drive shafts;

two cranks (29), each hinged to the end of a respective one of the arms about respective axes (X11) parallel to the hinge axes (X) of the pivots;

a connecting rod (30) hinged to the ends of the two cranks about axes (X22) parallel to the hinge axes (X) of the pivots;

synchronization means (24) for synchronizing the rotation of the two drive arms such that the rotations of the drive arms are equal and opposite;

two electric motors (27), each placed to control rotation of a respective one of the cranks relative to the associated arm; and control means (50) for controlling and synchronizing the speeds of rotation of the electric motors (27) and for controlling a phase difference between the electric motors (27).

5. A flying vehicle according to claim 4, wherein the synchronization means comprise a crossed belt (24) tensioned between the drive shafts (13).

6. A flying vehicle according to claim 4, wherein the electric motors (27) of the second oscillation generator are carried at the ends of the arms (26), each crank (29) being secured to a rotary end (28) of the corresponding motor.

* * * * *